(12) United States Patent
Herman-Saffar et al.

(10) Patent No.: US 10,586,046 B1
(45) Date of Patent: Mar. 10, 2020

(54) AUTOMATED SECURITY FEED ANALYSIS FOR THREAT ASSESSMENT

(71) Applicant: EMC IP Holding Company LLC, Hopkinton, MA (US)

(72) Inventors: Or Herman-Saffar, Beer-Sheva (IL); Amihai Savir, Sansana (IL); Stephen Todd, Shrewsbury, MA (US); Elik Levin, Modiin (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 163 days.

(21) Appl. No.: 15/660,599

(22) Filed: Jul. 26, 2017

(51) Int. Cl.
*G06F 21/57* (2013.01)
*G06N 20/00* (2019.01)

(52) U.S. Cl.
CPC .............. *G06F 21/57* (2013.01); *G06N 20/00* (2019.01)

(58) Field of Classification Search
CPC ................................ G06F 21/57; G06N 20/00
See application file for complete search history.

(56) References Cited

U.S. PATENT DOCUMENTS

| 8,413,244 B1* | 4/2013 | Nachenberg | H04L 63/145 713/188 |
| 8,739,290 B1* | 5/2014 | Jamail | G06F 11/0709 726/25 |

OTHER PUBLICATIONS

J.E. Short et al., "What's Your Data Worth?" MITSloan Management Review, http://sloanreview.mit.edu/article/whats-your-data-worth/, Mar. 3, 2017, 3 pages.
U.S. Appl. No. 15/136,327 filed in the name of Stephen Todd et al. filed Apr. 22, 2016 and entitled "Calculating Data Value via Data Protection Analytics."

* cited by examiner

*Primary Examiner* — Ayoub Alata
(74) *Attorney, Agent, or Firm* — Ryan, Mason & Lewis, LLP

(57) ABSTRACT

At least one security feed indicative of at least one security event that may impact or has impacted one or more assets associated with an organization is obtained. The at least one security feed is automatically classified as being relevant or not relevant. The at least one security feed is automatically ranked in response to the at least one security feed being classified as relevant. The ranking of the at least one security feed is presented to an entity to make an assessment of the security event.

20 Claims, 9 Drawing Sheets

```
"VmList":[⊟
  { ⊞ },
  { ⊞ },
  { ⊞ },
  { ⊟
    "Ip":"172.31.51.110",
    "ConnectedStorage":{ ⊞ },
    "MemoryAllocated":0,
    "ProcessorAllocated":0,
    "Ports":[ ⊞ ],
    "RunningApplications":[ ⊞ ],
    "InstalledApplications":[ ⊟
      {⊟
        "Name":Google Chrome",
        "Version":"55.0.2883.87",
        "Location":"C:\\Program Files (x86)\\Google\\Chrome\\Application"
      },
      {⊟
        "Name":"Nmap 6.47",
        "Versions":null,
        "Location":null
      },
      {⊟
        "Name":"WinPcap 4.1.3",
        "Version":"4.1.0.2980",
        "Location":null
      },
      {⊟
```

802
```
entry
├─ id = CVE-2004-0038
├─ vuln:vulnerable-configuration
├─ vuln:vulnerable-software-list
│    ├─ vuln:product cpe:/a:mcafee:epolicy_orchestrator:2.5:sp1
│    ├─ vuln:product cpe:/a:mcafee:epolicy_orchestrator:3.0:sp2a
│    ├─ vuln:product cpe:/a:mcafee:epolicy_orchestrator:3.0
│    ├─ vuln:product cpe:/a:mcafee:epolicy_orchestrator:2.5
│    └─ vuln:product cpe:/a:mcafee:epolicy_orchestrator:2.5.1
├─ vuln:cve-id CVE-2004-0038
├─ vuln:published-datetime 2004-06-14T00:00:00.000-04:00
├─ vuln:last-modified-datetime 2008-09-05T16:37:20.460-04:00
├─ vuln:cvss
│    └─ cvss:base_metrics
│         ├─ cvss:score 7.5
│         ├─ cvss:access-vector NETWORK
│         ├─ cvss:access-complexity LOW
│         ├─ cvss:authentication NONE
│         ├─ cvss:confidentiality-impact PARTIAL
│         ├─ cvss:integrity-impact PARTIAL
│         ├─ cvss:availability-impact PARTIAL
│         ├─ cvss:source http://nvd.nist.gov
│         └─ cvss:generated-on-datetime 2004-01-01T00:00:00.000-05:00
├─ vuln:security-protection ALLOWS_OTHER_ACCESS
├─ vuln:references
├─ vuln:references
├─ vuln:references
├─ vuln:references
└─ vuln:summary McAfee ePolicy Orchestrator (ePO) 2.5.1 Patch 13 and 3.0 SP2
```

804

| FEED ID | SOFTWARE | PUBLISHED DATE | CVSS SCORE | SUMMARY |
|---|---|---|---|---|
| CVE-2004-0038 | McAFEE EPOLICY ORCHESTRATOR 2.5,sp1 3.0,sp2a 3.0 2.5 2.5.1 | 2004-06-14 | 7.5 ACCESS-VECTOR: NETWORK ACCESS-COMPLEX: LOW AUTHENTICATION: NONE CONF. IMPACT: PARTIAL ... | "McAFEE EPOLICY ORCHESTRATOR (epo) 2.5.1 PATCH 1 3 AND sp2" ... |

FEATURE VECTOR — 806

1000

AUTOMATED SECURITY FEED ANALYSIS FOR THREAT ASSESSMENT

FIELD

The field relates generally to information processing systems, and more particularly to cyber-security threat assessment techniques for use with such information processing systems.

BACKGROUND

Nowadays every organization is exposed to cyber-security threats to their infrastructure including, but not limited to, information processing systems that the organization maintains or otherwise relies upon.

Organizations typically utilize multiple security information streams or sources, called "security feeds," to provide timely and actionable information about current security issues and vulnerabilities. These security feeds are intended to alert an organization about specific vulnerabilities and possibly their solutions. However, using manual analysis techniques, a security analyst of an organization may not know or otherwise fully appreciate which security feeds warn of the greatest cyber-security threats to the organization.

SUMMARY

Embodiments of the invention provide cyber-security threat assessment techniques using automated security feed analysis.

For example, in one embodiment, an automated security feed analysis method comprises the following steps. At least one security feed indicative of at least one security event that may impact or has impacted one or more assets associated with an organization is obtained. The at least one security feed is automatically classified as being relevant or not relevant. In response to the at least one security feed being classified as relevant, the at least one security feed is automatically ranked. The ranking of the at least one security feed is presented to an entity (e.g., a security analyst or system) to make an assessment of the security event.

Additional embodiments perform one or more of the above steps in accordance with an apparatus or system comprising a processor and memory, and in accordance with an article of manufacture or computer program product.

Advantageously, the threat assessment process according to illustrative embodiments automatically indicates the security feeds that are relevant to the organization, based on their content and connection to the organization, and the security feeds' importance to the organization, based on the sensitivity of the involved systems and the importance of former security feeds.

These and other features and advantages of the invention will become more readily apparent from the accompanying drawings and the following detailed description.

BRIEF DESCRIPTION OF THE DRAWINGS

FIG. 3 illustrates an example of a file representation of organizational information utilized by a system and process for automated security feed analysis, according to an illustrative embodiment.

FIG. 8 illustrates an example of a security feed and its features, according to an illustrative embodiment.

DETAILED DESCRIPTION

Figure 1:
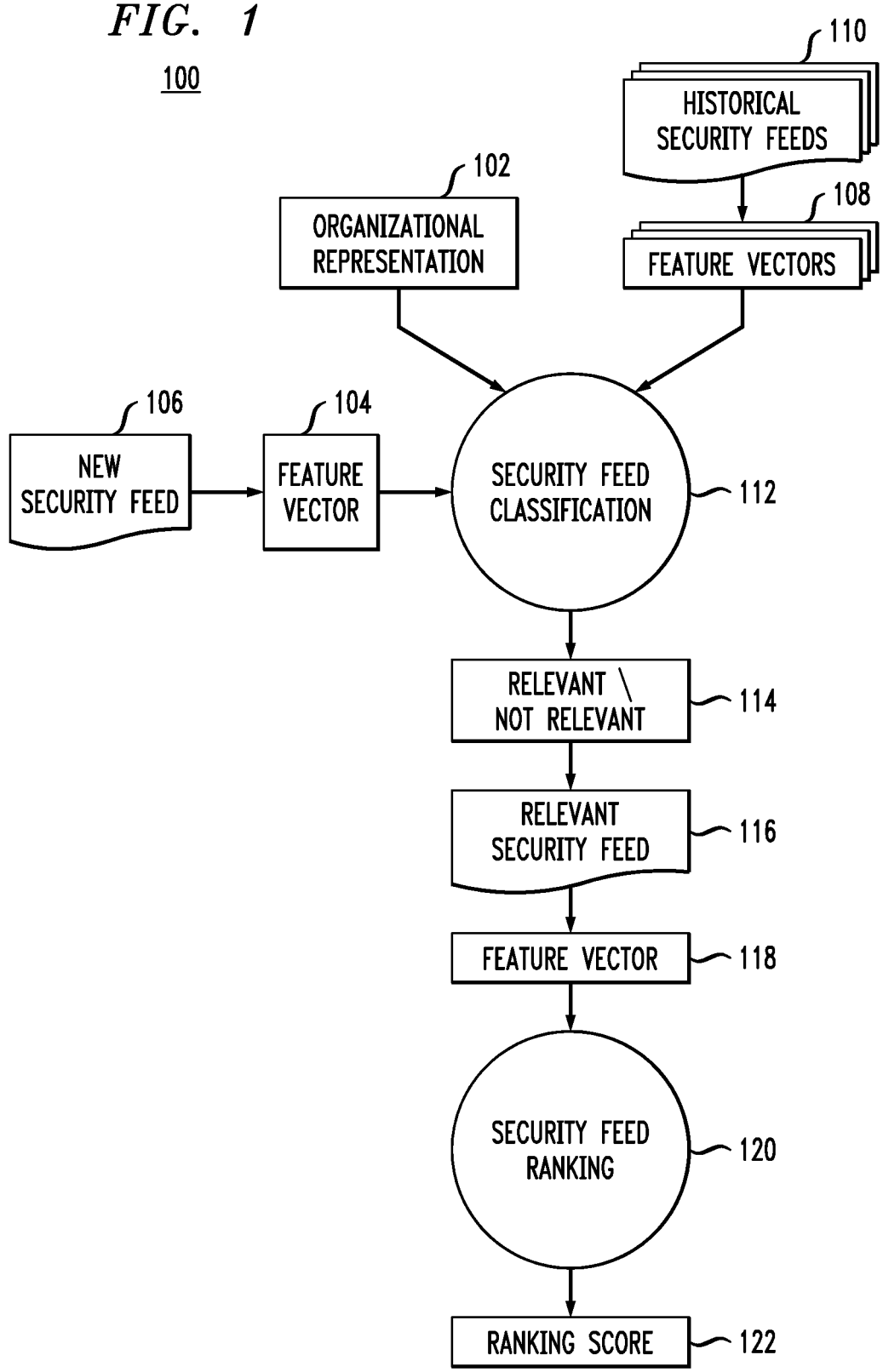
FIG. 1 illustrates a system and process for automated security feed analysis, according to an illustrative embodiment.

Illustrative embodiments will be described herein with reference to exemplary information processing systems and associated host devices, storage devices and other processing devices. It is to be appreciated, however, that embodiments are not restricted to use with the particular illustrative system and device configurations shown.

As mentioned above in the background, an organization exposed to cyber-security threats receives timely and actionable information about current security issues and vulnerabilities from security feeds. The term "organization" as used herein is intended to be broadly construed, and may comprise, for example, a business or any other entity, group, person, enterprise, or multiples thereof. Security feeds are generally information streams or sources alerting on specific security vulnerabilities and possibly their solutions.

In order to perform organization-oriented threat assessment, it is realized herein that one should only consider security feeds that are relevant to the organization. For example, a security analyst should detect the relevant security feeds and apply organizational decisions that protect the organization from related security events.

Further, security feeds have a wide severity range and the responding security analyst should know which feed should be treated first. It is therefore realized herein that it would be beneficial for the analyst to have a ranked list of the organizational-related security feeds in order to be able to react to the most severe security feed first.

Still further, it is realized herein that the value of the data assets across the organization can be important for the determination of security feed relevance to the organization. A security feed containing critical information on high-value data assets should be prioritized for the security analyst so he would be able to treat it first.

To address the above and other issues, illustrative embodiments provide automated security feed classification and ranking methods. More specifically, for given up-to-date security feeds and organization characteristics, such methods automatically indicate the security feeds that are relevant to the organization based on their content and connection with the organization, as well as the security feeds' importance to the organization based on a determination of ranking scores for the relevant security feeds.

Security feeds can arrive from multiple sources. Therefore, their analysis should be comprehensive, but nonetheless preferably provide the same characteristics for every security feed.

Accordingly, illustrative embodiments provide a security analyst with the relevant up-to-date security feeds as well as their ranking scores in order to make the threat assessment process more efficient and simple.

Before describing illustrative embodiments in detail, various technical and conceptual problems with the existing manual, end-to-end, threat assessment process performed by a security analyst are described below.

The existing security analysis approach is done by individuals, i.e., manually. The security analyst receives unfiltered security feeds from multiple data sources and explores them to detect relevant information that can be used to protect the organization. The number of security feeds increases with the number of new security attacks. Therefore, the analysis process takes a significant amount of time. There might be organizational systems that filter security feeds and attempt to deliver the analyst filtered feeds, however, the amount of security feeds presented to the analyst is still typically too large to handle manually. This results in inaccurate prioritization of security feeds which can lead to undesirable consequences (e.g., loss of data, loss of revenue, loss of reputation, liability, etc.) for the organization.

Since analysis of security feeds and the evaluation of their impact on the organization is done by individuals in the existing approach, it is very difficult to consider the vulnerability of the organizational assets and to carefully protect the high-value data assets, especially when it comes to large organizations.

The security analyst should take into account the organization when analyzing security feeds. In the existing approach, there is no one way to represent an organization and the feed analysis is done only based on the analyst's familiarity with the organization.

Security feeds from variant types and sources can be composed differently. The feed types include alerts, security tips, vulnerabilities etc. For example, the alert feeds usually include the following fields: overview, description, impact, references and affected systems. However, they may contain less or additional fields. This variation leads to difficulty in the analysis of the security feeds. Even an experienced analyst can come across new types and sources of security feeds and will need to analyze them in a new way.

Furthermore, analyst perspective may influence the analysis process and decision making. Different analysts can make different security decisions based on their knowledge and experience and thereby influence the organization vulnerability differently. An experienced security analyst could perform a correct feed analysis, while a new security analyst could cause wrong decisions to be made based on his faulty analysis.

Since the security feeds can arrive from several sources, feeds containing the same information can appear differently when arriving from different sources. This can lead to new feed analysis of the same security information. Such duplicated feed analysis wastes time when the information is already updated in the organization systems.

Several different security feeds can be related to the same subject. Two or more related feeds are likely to arrive separately and not in the same time period. The security analyst's ability to recognize the feed relevance for an existing subject is low. This prevents the analyst from seeing the big picture of the security event described by the related feeds.

Illustrative embodiments overcome the above and other drawbacks of the existing manual security feed analysis approach by providing an automated system and methods for classifying and ranking security feeds for threat assessment. The threat assessment process is configured to automatically indicate: (i) the security feeds that are relevant to the organization, based on their content and connection to the organization; and (ii) the security feeds' importance to the organization, based on the sensitivity of the involved systems and former security feeds importance. This automated and comprehensive approach has many advantages. Examples of such advantages include, but are not limited to:

(i) The analysis process is general and allows for easy integration of new security feeds.

(ii) The value of the data assets across the organization is considered when creating a ranked list of security feeds for the analyst.

(iii) The organization representation is very informative and provides unambiguous representation that allows accurate security feed ranking.

(iv) Results are easily interpretable and provide straightforward security feed ranking for the analysts.

In one illustrative embodiment, the threat assessment process involves several consecutive stages. These stages include: pulling and merging the security feeds from multiple data sources, cleaning and parsing the data, representing the organization, developing a classification model to indicate which security feeds are relevant to the organization, and evaluating a ranking model to determine a ranking score for each security feed, based on importance of organizational assets involved and historical relevant feed scores.

FIG. 1 illustrates a system and process 100 for automated security feed analysis, according to an illustrative embodiment. As shown, organizational representation 102, a feature vector 104 extracted from new security feed 106, and one or more feature vectors 108 extracted from one or more historical security feeds 110 are fed as input to a security feed classification module 112. The historical security feeds 110 precede the new (current) security feed 106 in time.

In module 112, a classification model is applied to determine whether new security feed 106 is relevant to the organization or not (as denoted in block 114). That is, the classifier classifies the feed into either a relevant class or a non-relevant class. Of course, other relevance classes (varying degrees of relevance) can be added to the model. In the case that the new security feed 106 is relevant (denoted as block 116), the process uses feature vector 118 (which may be the same or similar to feature vector 104 or may contain newly extracted features) from the new (relevant) security feed 116 and applies a ranking model to the security feed in security feed ranking module 120. The ranking model is used for determination of a ranking score 122 for the relevant security feed.

It is to be appreciated that process 100 is applied to multiple (two or more) security feeds such that a relevance determination is made and then each relevant security feed is given a ranking score which are listed in rank order in a ranking list presented to a security analyst or a system in order to take action to protect the organization if necessary.

By way of example only, organizational representation 102 may comprise information such as, but not limited to: software\hardware inventory, asset user information, asset locations, value of each data asset across the organization, and relationships between organizational assets. Organizational representation 102 will be described in further illustrative detail below.

Furthermore, security feed processing (e.g., feature vector extraction 104, 108, 118) according to illustrative embodiments may comprise: extracting relevant fields from each security feed; combining the security feed fields into representative text document and categorical data, comprehensive analysis for security feeds from different sources, and multiple sources security feed integration.

Automatic security feed classification in module 112 is accomplished in an illustrative embodiment as follows:

(i) Security feed classification based on historical security feeds 110. Past security feeds' feature vectors 108 and their classes are used to create a classification model for new security feeds.

(ii) Recognize organizational assets to which the security feed is relevant, based on textual comparison between the organizational representation 102 and the current security feed.

Automatic security feed ranking in module 120 is executed among the security feeds that are relevant to the organization and is derived from multiple criteria, for example, in one illustrative embodiment:

(i) Value of data assets involved with the security feed.

(ii) Organizational importance of assets involved with the security feed.

(iii) Communication between assets across the organization, in case that one of the connected assets is discussed in the security feed.

Further illustrative details of the main stages of process 100 as well as other functionalities will now be described in the context of FIGS. 2-10.

Organizational Representation

Figure 2:
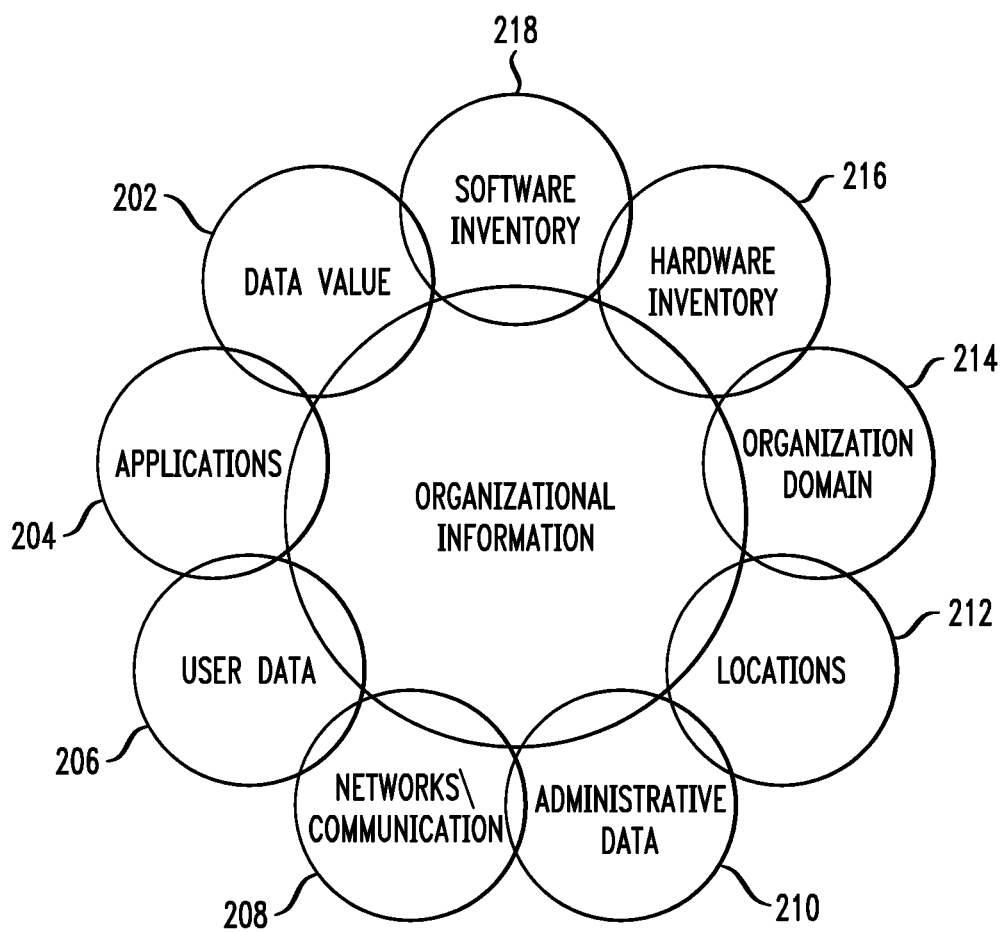
FIG. 2 illustrates an example of a graphical representation of organizational information utilized by a system and process for automated security feed analysis, according to an illustrative embodiment.

Illustrative embodiments realize that in order to associate a security feed with specific organizational assets, a complete (or as close to complete as possible) representation of the organization should be considered. FIG. 2 represents the organizational information taken into account (as organizational representation 102) to determine whether a given security feed is relevant to the organization or not and then to provide rank scoring. To obtain a complete representation, each asset across the organization should be represented by this information.

Thus, as shown, organizational information 200 may comprise, but not be limited to, data value 202, applications 204, user data 206, networks/communication 208, administrative data 210, locations 212, organization domain 214, hardware inventory 216, and software inventory 218.

An example of organizational information (considered as another example of organizational representation 102) in the form of a JavaScript Object Notation (JSON) file 300 is shown in FIG. 3. In an illustrative embodiment, file 300 contains all the information 200 mentioned above for each asset in the organization.

Figure 4:
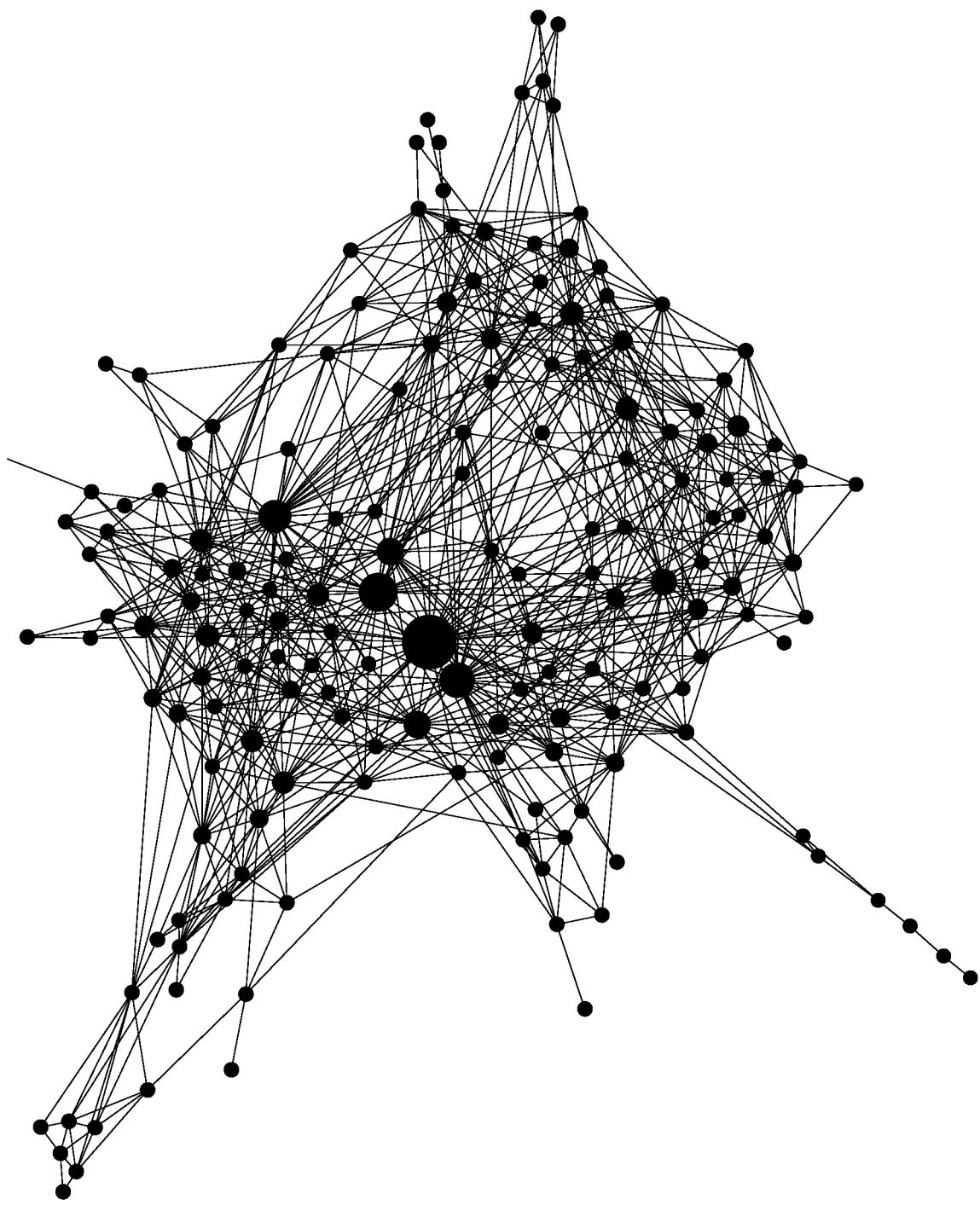
FIG. 4 illustrates an example of a visualization of connections between organizational assets utilized by a system and process for automated security feed analysis, according to an illustrative embodiment.

In an illustrative embodiment, relationships between the organizational assets is also taken into consideration when the security feed relevance is calculated. FIG. 4 provides a visualization 400 of the connections between the organizational assets in the form of an organizational network (another example of organizational representation 102). Each circle represents a specific asset and the arrows represent the data flow between the assets. The size of circles indicates the value of data stored on the asset.

Security feeds are prioritized in case that they involve information that relates to sensitive assets. In an illustrative embodiment, the sensitivity of an organizational asset may be determined based on the following measures: (i) the value of data stored on the asset; (ii) the amount of data flow through the asset; and (iii) the connectivity of the asset to other assets.

Prioritize High-Value Data Assets

One main advantage of the automated security feed analysis approach according to illustrative embodiments is the use of a data valuation metric for each organizational asset. More specifically, a security feed related to a high-value data asset within the organization is placed in the top of the ranked security feed list. Security feeds that deal with relatively high-value data assets receive high ranking scores. The availability of data value scores allows to increase the confidence in the feed score and to place the security feed higher in the ranked list.

Recent research into the economic value or business priority of data has resulted in different approaches for measuring and storing specific numeric metadata (e.g., either currency amounts or relative rankings) alongside of corporate data assets. Data valuation metadata can then be used for a variety of business purposes (e.g., beginning to treat data as a balance sheet asset).

Note that any number of valuation scores may be assigned to a data set, such as an economic cost (e.g. a dollar or euro amount), the intrinsic value (IVI), the business value (BVI), etc. Additional valuation metadata can result in richer and more accurate security threat prioritization.

Figure 5:
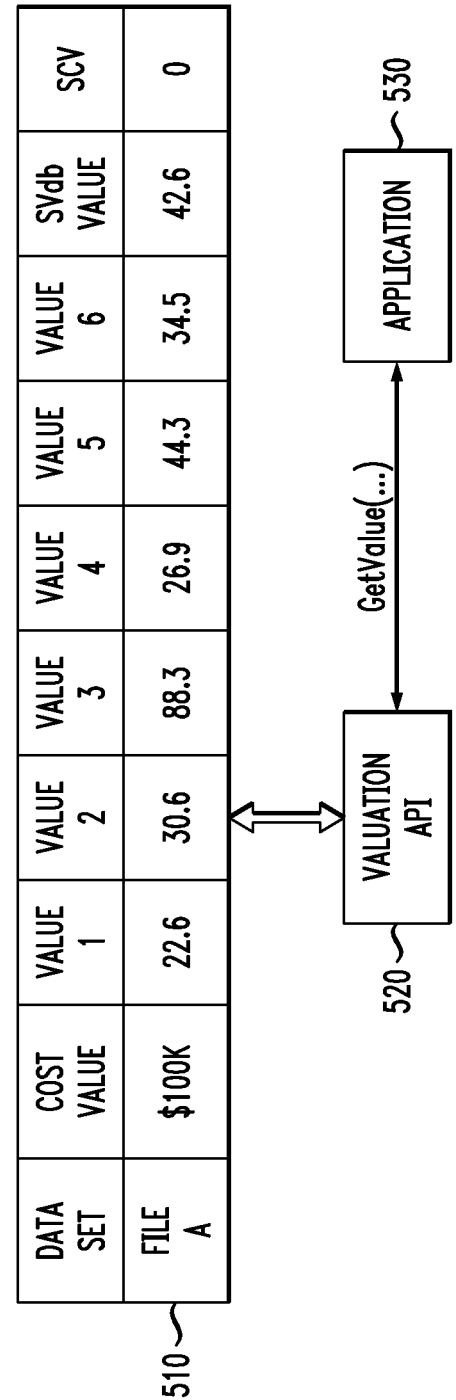
FIG. 5 illustrates an example of a data valuation table utilized by a system and process for automated security feed analysis, according to an illustrative embodiment.

As illustrated in methodology 500 in FIG. 5, a valuation table 510 represents a table stored for file A (i.e., an organizational asset). Table 510 shows illustrative values computed for a set of data valuation algorithms (i.e., value 1 is an output value that corresponds to a first valuation algorithm, value 2 is an output value that corresponds to a second valuation algorithm, and so on). Also shown is a cost value which represents a cost to the organization associated with obtaining file A (e.g., purchase cost). Note that one or more of the valuation algorithms can implement valuation criteria that are standard for and/or required by a specific industry. Advantageously, table 510 also includes an SVdb (streaming valuation database) value that corresponds to a valuation algorithm executed on file A at the time of ingest of file A to the information processing system of the organization. Table 510 may also include an SCV (streaming correlation valuation) value which indicates a correlation between file A and some other organizational asset (e.g., file C). Thus, if the SCV value is zero (as illustratively shown), this means that the content of file C has no correlation with respect to file A. This correlation information can also be obtained from or supplemented by an organizational information network such as shown in FIG. 4.

As further shown, a valuation application programming interface (API) 520 can fetch a value for file A based on a query from an application 530. In illustrative embodiments, the application 530 may be process 100 (or one or more of its components) which fetches or otherwise obtains one or more data values for file A from table 510 for use in security feed classification and/or ranking operations.

By way of example only, valuation algorithms used to generate one or more of the data values illustrated in table 510 may comprise, but are not limited to:

unstructured tokenization algorithms (UTA) described in U.S. patent application Ser. No. 14/863,783, filed Sep. 24, 2015, now U.S. patent Ser. No. 10/324,962, entitled "Unstructured Data Valuation," the disclosure of which is incorporated herein in its entirety;

application development and deployment velocity valuation algorithms described in U.S. patent application Ser. No. 14/998,112, filed Dec. 24, 2015, now U.S. Pat. No. 9,778,931, entitled "Data Valuation Based on Development and Deployment Velocity," the disclosure of which is incorporated herein in its entirety;

data ingest valuation algorithms described in U.S. patent application Ser. No. 15/135,790, filed Apr. 22, 2016, entitled "Data Valuation at Content Ingest," the disclosure of which is incorporated herein in its entirety;

data value tree generation techniques described in U.S. patent application Ser. No. 15/135,817, filed Apr. 22, 2016, entitled "Data Value Structures," the disclosure of which is incorporated herein in its entirety; and valuation algorithms based on analysis of a backup and recovery ecosystem described in U.S. patent application Ser. No. 15/136,327, filed Apr. 22, 2016, entitled "Calculating Data Value via Data Protection Analytics," the disclosure of which is incorporated herein in its entirety.

It is to be appreciated that the above valuation processes are intended to be examples only, and thus other valuation algorithms and techniques can be used in alternative embodiments. One additional non-limiting example includes a business value of information metric which takes into account the relevance of one or more business units of an organization that uses a given data asset.

It is also to be appreciated that while such valuation processes may be applied to data sets associated with the organization, the valuation techniques can also be applied to other assets related to data of the organization including, but not limited to, applications, services, etc.

Accordingly, the data values are fed into the one or more automated security analysis algorithms for prioritizing security feeds. For example, as a new security feed 106 flows into process 100, the following steps are executed to calculate value:

(i) Data assets relevant to the security feed are discovered (e.g., this security threat is relevant to "File A").

(ii) The value of relevant data assets is fetched from the valuation ecosystem (e.g., valuation table 510) and fed into the security algorithm.

(iii) If the valuation is "unknown" or "uninitialized," a number of different approaches can be used, by way of example: (a) data value is calculated on the fly (in real time or near real time) by one or more of the valuation algorithms described above or by some other system or method; or (b) value is defaulted to "critical" to gain the attention of the security analyst, and motivate the organization to address unvalued assets.

Relationships Between Organizational Assets Illustrative embodiments consider the relationships between organizational assets. An asset that communicates with numerous assets can affect the other assets in case of a security event. Such asset will therefore receive high scoring, to avoid situation in which a large part of the organization is paralyzed when security event occurs on one asset. In addition, when a security event occurs on one asset, the connected assets will also be examined to ensure they are not affected by the security event. In one example, the above-mentioned SCV valuation technique (e.g., SCV value in table 510) can be utilized to quantify and dynamically track the relationship between assets in the organization. Alternatively, an information network such as network 400 (FIG. 4) can be used.

Content Based Security Feed Analysis As mentioned above, in the existing approach, security feed ranking is done by individuals. Therefore, the process is biased and depends on the analyst that receives the feeds and his expertise. In contrast, illustrative embodiments use only content and take into account all the security feeds to provide a holistic and reliable view of security events. The security feeds are analyzed to extract the important information such as, but not limited to, related software and versions, Common Vulnerability Scoring System (CVSS) score (standard measurement of the information technology vulnerability impacts), published date and short feed summary. An example of security feed and its features are described below in the context of FIG. 8.

The textual information from the feed such as a software list and summary is compared to the organizational textual information using text analytics techniques. The categorical information such as the CVSS score is used as structured data in order to determine classification of the feed. The classification process will be further described below in the context of FIG. 6.

Comprehensive Analysis for Security Feeds from Different Sources

Illustrative embodiments automatically provide analysis to a variety of security feeds from different sources. Advantageously, the automated security analysis process is able to analyze every security feed regardless of its origin and structure.

Multiple Sources Security Feed Integration

Incident-related security feeds can arrive in different time periods and come from multiple sources. In the existing approach, all the incoming feeds are divided between the analysts. Hence, the analysts can mistakenly analyze identical feeds twice or not be able to infer extra knowledge on the incident which comes from another security feed. It is realized herein that the integration of related feeds is extremely important in order to be able to provide the analyst an overall representation of the specific security incident. Illustrative embodiments take into consideration all the relevant security feeds and thus present the analyst with a complete picture of the incident.

Automatic Security Feed Classification

Figure 6:
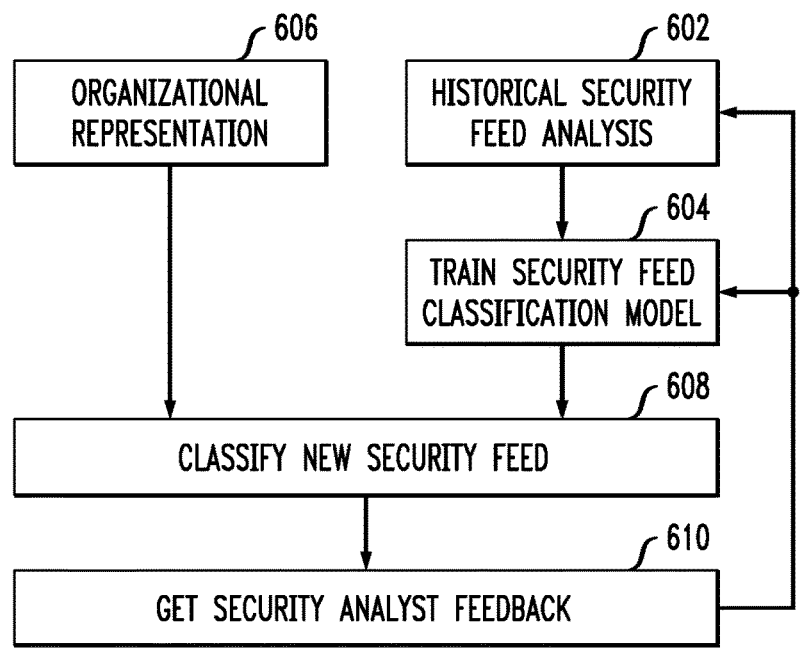
FIG. 6 illustrates a security feed classification process for automated security feed analysis, according to an illustrative embodiment.

Once the organizational representations (e.g., 102) and security feed representations are prepared (e.g., feature vectors 104, 108), a security feed classification algorithm is applied in module 112 to determine the feed relevance to the organization. FIG. 6 depicts algorithm 600 for performing automated security feed classification.

In an illustrative embodiment, the class of the security feed (i.e., relevant \not relevant) is determined based on two factors:

(i) The first factor is based on historical security feeds. In this factor, the process 100 uses historical security feeds 602 and their classes, whether they were relevant to the organization or not, to create (train 604) a classification model that will determine whether the current feed is relevant or not.

(ii) The second factor recognizes organizational assets that the security feed is relevant to, based on textual comparison of the feed content and the organization's textual information as well as comparison between the structured data of the feed and the organization. In case that the feed is relevant to at least one asset, the feed is considered to be relevant to the organization. This factor is based on organizational representation 606.

The combination of these two factors leads to an accurate classification 608 of new security feeds. After the decision is made with regard to the security feed relevance, feedback from a security analyst is obtained 610 in order to confirm the classification and improve the classification model.

The repository of classified security feeds is saved for reuse (as historical feeds), i.e., for enrichment of new, related security feeds and for training and improvement of the classification model.

Automatic Security Feed Ranking

One main benefit of the automated security feed analysis according to illustrative embodiments is that security feed relevance ranking is performed automatically. The security analyst will not have to decide which security feed should be treated first. Rather, in illustrative embodiments, he will receive a ranked list of security feeds, e.g., from the most significant security feed (e.g., highest importance to the organization) to the least security feed (e.g., lowest importance to the organization).

Figure 7:
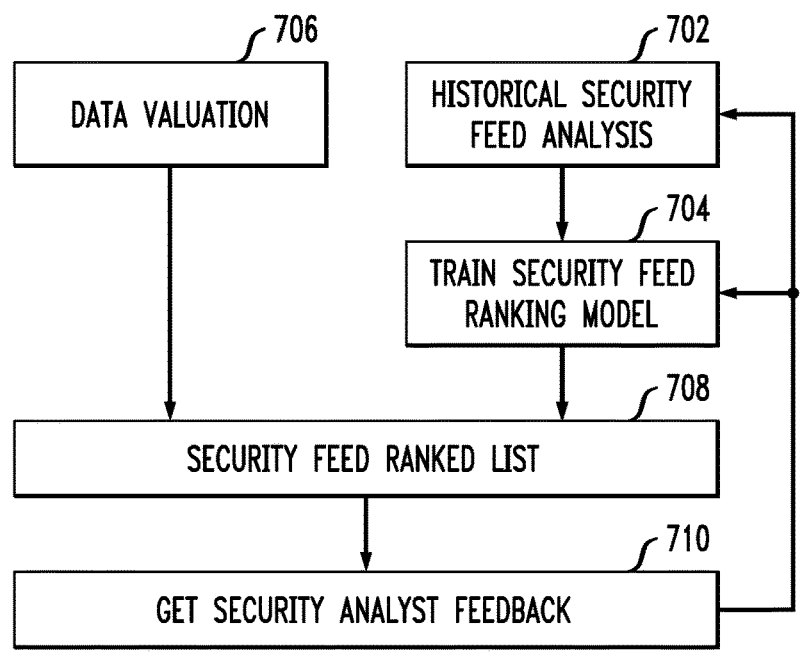
FIG. 7 illustrates a security feed ranking process for automated security feed analysis, according to another illustrative embodiment.

Once the relevant security feeds list is created, it is given as an input for the ranking algorithm. The value of the data assets related to the feed content and the CVSS score of the security feed (if available) may also be input for the algorithm. FIG. 7 depicts algorithm 700 for performing automated security feed ranking.

In this illustrative embodiment, ranking is based on two factors. The ranking algorithm 700 is based on historical security feeds and their rankings 702 (first factor) as well as the data value 706 of the involved assets (second factor). The data values 706 can be more generally considered part of the organizational representation. The ranking model is trained (704) based on the historical security feeds to obtain a ranking score for each new security feed. Then, the value of the data assets (706) involved is taken into account and increases the ranking score in case of high-value data assets. Note that data valuation 706 can be obtained as illustratively described above in the context of FIG. 5.

The combination of these two factors leads to an accurate ranking 708 (ranked list) for new security feeds. After the decision is made with regard to the security feed rank, feedback from a security analyst is obtained 710 in order to confirm the ranking and improve the ranking model.

The repository of ranked security feeds is saved for reuse (as historical feeds), i.e., for training and improvement of the ranking model.

It is to be appreciated that data valuation can also be utilized to perform the classification process.

As explained above, when a new security feed is published, it is first analyzed to extract its important information and create a feature vector that represents the feed. Feature vector extraction 800 is illustrated in FIG. 8. As shown, a new security feed is represented by information file 802. Features 804 are extracted from the information file 802. The features 804 represent feature vector 806.

Figure 9:
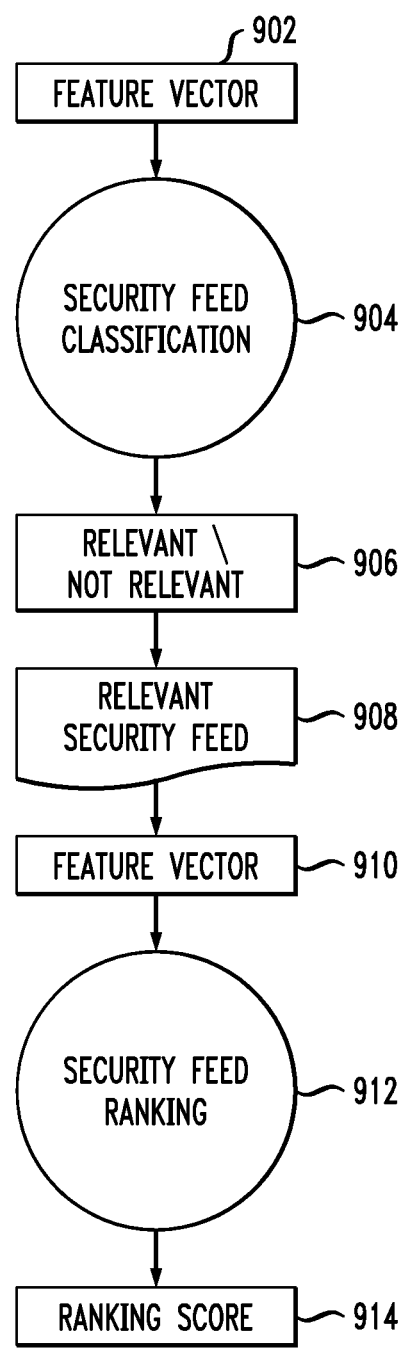
FIG. 9 illustrates an automated classification and ranking process for a given security feed, according to an illustrative embodiment.

As illustrated in an overview of the process 900 in FIG. 9, a feature vector (902) is fed into the classification algorithm (904) to determine (906) whether the security feed is relevant to the organization or not. In case that this feed is relevant (908), its information (910) is fed into the ranking algorithm (912) to receive a ranking score (914) which provides the analyst with an indication of feed prioritization, allowing an entity (e.g., a security analyst or a system) to make a threat assessment and take any necessary action.

At least portions of the automated system and methods for classifying and ranking security feeds shown in FIGS. 1-9 may be implemented using one or more processing platforms associated with one or more information processing systems. In some embodiments, a given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one. In many embodiments, logic may be executed across one or more physical or virtual processors. In certain embodiments, a virtual processor may be mapped to and executed on or across a portion of one or more virtual or physical processors.

As is apparent from the above, one or more of the processing modules or other components of the automated system and method for classifying and ranking security feeds shown in FIGS. 1-9 may each run on a computer, server, storage device or other processing platform element. A given such element may be viewed as an example of what is more generally referred to herein as a "processing device." An example of such a processing platform is processing platform 1000 shown in FIG. 10.

The processing platform 1000 in this embodiment comprises a plurality of processing devices, denoted 1002-1, 1002-2, 1002-3, . . . 1002-N, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

As mentioned previously, some networks utilized in a given embodiment may comprise high-speed local networks in which associated processing devices communicate with one another utilizing Peripheral Component Interconnect Express (PCIe) cards of those devices, and networking protocols such as InfiniBand, Gigabit Ethernet or Fibre Channel.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA) or other type of processing circuitry, as well as portions or combinations of such circuitry elements.

The memory 1012 may comprise random access memory (RAM), read-only memory (ROM) or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered embodiments of the present disclosure. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Figure 10:
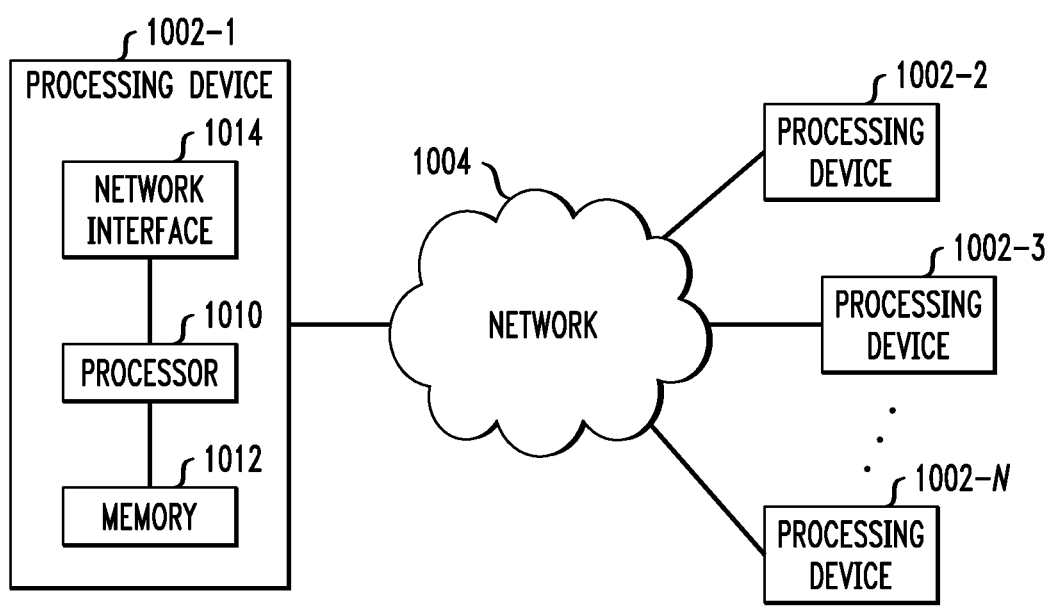
FIG. 10 illustrates a processing platform used to implement systems and methods for automatically analyzing security feeds, according to an illustrative embodiment.

Also included in the processing device 1002-1 of the example embodiment of FIG. 10 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, this particular processing platform is presented by way of example only, and other embodiments may include additional or alternative processing platforms, as well as numerous distinct processing platforms in any combination, with each such platform comprising one or more computers, servers, storage devices or other processing devices.

For example, other processing platforms used to implement embodiments of the disclosure can comprise different types of virtualization infrastructure, in place of or in addition to virtualization infrastructure comprising virtual machines. Such virtualization infrastructure illustratively includes container-based virtualization infrastructure configured to provide Docker containers or other types of Linux containers (LXCs).

The containers may be associated with respective tenants of a multi-tenant environment of the system and method for classifying and ranking security feeds, although in other embodiments a given tenant can have multiple containers. The containers may be utilized to implement a variety of different types of functionality within the system. For example, containers can be used to implement respective cloud compute nodes or cloud storage nodes of a cloud computing and storage system. The compute nodes or storage nodes may be associated with respective cloud tenants of a multi-tenant environment. Containers may be used in combination with other virtualization infrastructure such as virtual machines implemented using a hypervisor.

As another example, portions of a given processing platform in some embodiments can comprise converged infrastructure such as VxRail™, VxRack™ or Vblock® converged infrastructure commercially available from VCE, the Virtual Computing Environment Company, now the Converged Platform and Solutions Division of Dell EMC. For example, portions of a value-based governance system of the type disclosed herein can be implemented utilizing converged infrastructure.

It should therefore be understood that in other embodiments different arrangements of additional or alternative elements may be used. In many embodiments, at least a subset of these elements may be collectively implemented on a common processing platform, or each such element may be implemented on a separate processing platform.

Also, in other embodiments, numerous other arrangements of computers, servers, storage devices or other components are possible in the system and methods described herein. Such components can communicate with other elements of the system over any type of network or other communication media.

As indicated previously, in some embodiments, components of the automated system and method for classifying and ranking security feeds as disclosed herein can be implemented at least in part in the form of one or more software programs stored in memory and executed by a processor of a processing device. For example, at least portions of the execution environment or other system components are illustratively implemented in one or more embodiments the form of software running on a processing platform comprising one or more processing devices.

It should again be emphasized that the above-described embodiments of the disclosure are presented for purposes of illustration only. Many variations and other alternative embodiments may be used. For example, the disclosed techniques are applicable to a wide variety of other types of security feeds. Also, the particular configurations of system and device elements, associated processing operations and other functionality illustrated in the drawings can be varied in other embodiments. Moreover, the various assumptions made above in the course of describing the illustrative embodiments should also be viewed as exemplary rather than as requirements or limitations of the embodiments. Numerous other alternative embodiments within the scope of the appended claims will be readily apparent to those skilled in the art.

What is claimed is:

1. A method comprising:
   obtaining at least one security feed indicative of at least one security attack that has impacted one or more assets associated with an organization or presents an impact vulnerability to the one or more assets;
   processing the at least one security feed by extracting one or more features of the at least one security feed to form one or more feature vectors;
   automatically classifying the at least one security feed as being relevant or not relevant to the organization based on the one or more feature vectors, wherein classifying is performed by applying the one or more feature vectors to a classification algorithm;
   automatically ranking the at least one security feed in response to the at least one security feed being classified as relevant;
   presenting the ranking of the at least one security feed to an entity to make an assessment of the security attack to protect the organization from the at least one security attack; and
   determining one or more actions based at least in part on the assessment of the security attack;
   wherein the above steps are executed by at least one processing device comprising a processor operatively coupled to a memory.

2. The method of claim 1, wherein the automated classifying step further comprises determining relevance based on a comparison between a representation of information of the one or more assets of the organization and the at least one security feed.

3. The method of claim 2, wherein the representation of information of the one or more assets of the organization comprises an organizational network that represents value of each asset of the organization and relationships between assets.

4. The method of claim 2, wherein the representation of information of the one or more assets of the organization comprises one or more information files that respectively correspond to the one or more assets of the organization.

5. The method of claim 2, wherein the automated classifying step further comprises determining relevance based on one or more security feeds that preceded the at least one security feed in time.

6. The method of claim 5, wherein the automated classifying step further comprises utilizing relevance classification of the one or more security feeds that preceded the at least one security feed to train a classification model used to classify the at least one security feed.

7. The method of claim 1, wherein the automated ranking step further comprises computing a ranking score based on one or more security feeds that preceded the at least one security feed in time.

8. The method of claim 7, wherein the automated ranking step further comprises utilizing rankings of the one or more security feeds that preceded the at least one security feed to train a ranking model used to rank the at least one security feed.

9. The method of claim 7, wherein the automated ranking step further comprises computing the ranking score for the at least one security feed based on one or more values attributed to the one or more assets of the organization.

10. The method of claim 9, wherein the one or more values attributed to the one or more assets of the organization are computed by one or more valuation algorithms.

11. The method of claim 10, wherein at least one of the valuation algorithms computes correlation between two or more assets of the organization.

12. The method of claim 1, wherein the one or more extracted features comprise metadata relating to the one or more assets.

13. The method of claim 1, wherein the one or more extracted features comprise a standard measurement of vulnerability impact score.

14. The method of claim 1, wherein at least a second security feed indicative of a second security attack that may impact or has impacted the one or more assets associated with the organization is obtained, and the automated classifying step and automated ranking step are performed on the second security feed.

15. The method of claim 14, wherein the presenting step further comprises presenting the rankings of the at least one security feed and the second security feed in a ranked list to the entity to make an assessment of the security attack.

16. The method of claim 14, wherein the at least one security feed and the second security feed are from different sources.

17. The method of claim 14, wherein the at least one security attack and the second security attack are related to the same security incident.

18. A system comprising:
at least one processor, coupled to a memory, and configured to:
obtain at least one security feed indicative of at least one security attack that has impacted one or more assets associated with an organization or presents an impact vulnerability to the one or more assets;
process the at least one security feed by extracting one or more features of the at least one security feed to form one or more feature vectors;
automatically classify the at least one security feed as being relevant or not relevant to the organization based on the one or more feature vectors, wherein classifying is performed by applying the one or more feature vectors to a classification algorithm;
automatically rank the at least one security feed in response to the at least one security feed being classified as relevant;
present the ranking of the at least one security feed to an entity to make an assessment of the security attack to protect the organization from the at least one security attack; and
determine one or more actions based at least in part on the assessment of the security attack.

19. An article of manufacture comprising a non-transitory processor-readable storage medium having stored therein program code of one or more software programs, wherein the program code when executed by at least one processing device causes said at least one processing device to:
obtain at least one security feed indicative of at least one security attack that has impacted one or more assets associated with an organization or presents an impact vulnerability to the one or more assets;
process the at least one security feed by extracting one or more features of the at least one security feed to form one or more feature vectors;
automatically classify the at least one security feed as being relevant or not relevant to the organization based on the one or more feature vectors, wherein classifying is performed by applying the one or more feature vectors to a classification algorithm;
automatically rank the at least one security feed in response to the at least one security feed being classified as relevant;
present the ranking of the at least one security feed to an entity to make an assessment of the security attack to protect the organization from the at least one security attack; and
determine one or more actions based at least in part on the assessment of the security attack.

20. The system of claim 18, wherein the automated ranking step further comprises computing a ranking score based on one or more security feeds that preceded the at least one security feed in time.

* * * * *